United States Patent [19]
Haws

[11] Patent Number: 5,842,756
[45] Date of Patent: Dec. 1, 1998

[54] TRACTION DEVICE FOR WHEELS AND PROCESS FOR MAKING

[76] Inventor: Spencer Kim Haws, P.O. Box 315, Mesa, Wash. 99343

[21] Appl. No.: 782,449

[22] Filed: Jan. 13, 1997

[51] Int. Cl.⁶ .................................................. B62D 55/18
[52] U.S. Cl. ...................... 305/19; 305/201; 152/185.1; 152/226
[58] Field of Search .................... 305/6, 15, 19, 305/185, 40, 53, 200, 201, 202; 152/185.1, 225 R, 226, 227, 228

[56] References Cited

U.S. PATENT DOCUMENTS

| | | | |
|---|---|---|---|
| 1,373,905 | 4/1921 | Miller | 305/202 X |
| 1,511,573 | 10/1924 | Miller | 305/53 X |
| 1,597,454 | 8/1926 | Miller | 305/204 X |
| 1,840,779 | 1/1932 | Johnston | 305/19 |
| 2,179,587 | 11/1939 | Deardorff | 305/53 |
| 3,937,237 | 2/1976 | Boone et al. | 137/1 |
| 4,408,646 | 10/1983 | Forsyth | 305/19 X |

FOREIGN PATENT DOCUMENTS

| | | | |
|---|---|---|---|
| 473740 | 10/1937 | United Kingdom | 305/202 |

*Primary Examiner*—Russell D. Stormer
*Attorney, Agent, or Firm*—Floyd E. Ivey

[57] ABSTRACT

A traction device for wheels focusing on irrigation system wheels and the manufacturing process for making the traction device. Multiple traction device segments are joined to encompass a tire/wheel unit of an irrigation system tire/wheel drive system generally about the circumferential perimeter. The traction device segments are engaged by the tire/wheel unit at its circumferential perimeter causing the traction device segments to rotate as the tire/wheel unit rotates. The traction device segments have a surface which is interposed between the tire/wheel unit, at its circumferential perimeter, and the muddy ground of the irrigated field increasing the surface area of contact and decreasing the likelihood of the tire/wheel unit becoming stuck or mired in mud. A square of sheet metal is sheared at the corners along one diagonal with the two shear line forming the skirt edges of skirts. A pad is intermediate the skirts which is press formed with tread forms matching tread patterns of the tire/wheel unit. Contact between the skirt and the tire/wheel unit is reduced by press forming the skirt with a skirt form protruding toward the tire/wheel unit and rolling the skirt edge with a skirt radius. Adjoining traction device segments are connected by lugs having apertures, formed in the sheet metal by press forming or separately welded to the respective traction device segments, which align and are bolted together permitting movement between the lugs.

10 Claims, 9 Drawing Sheets

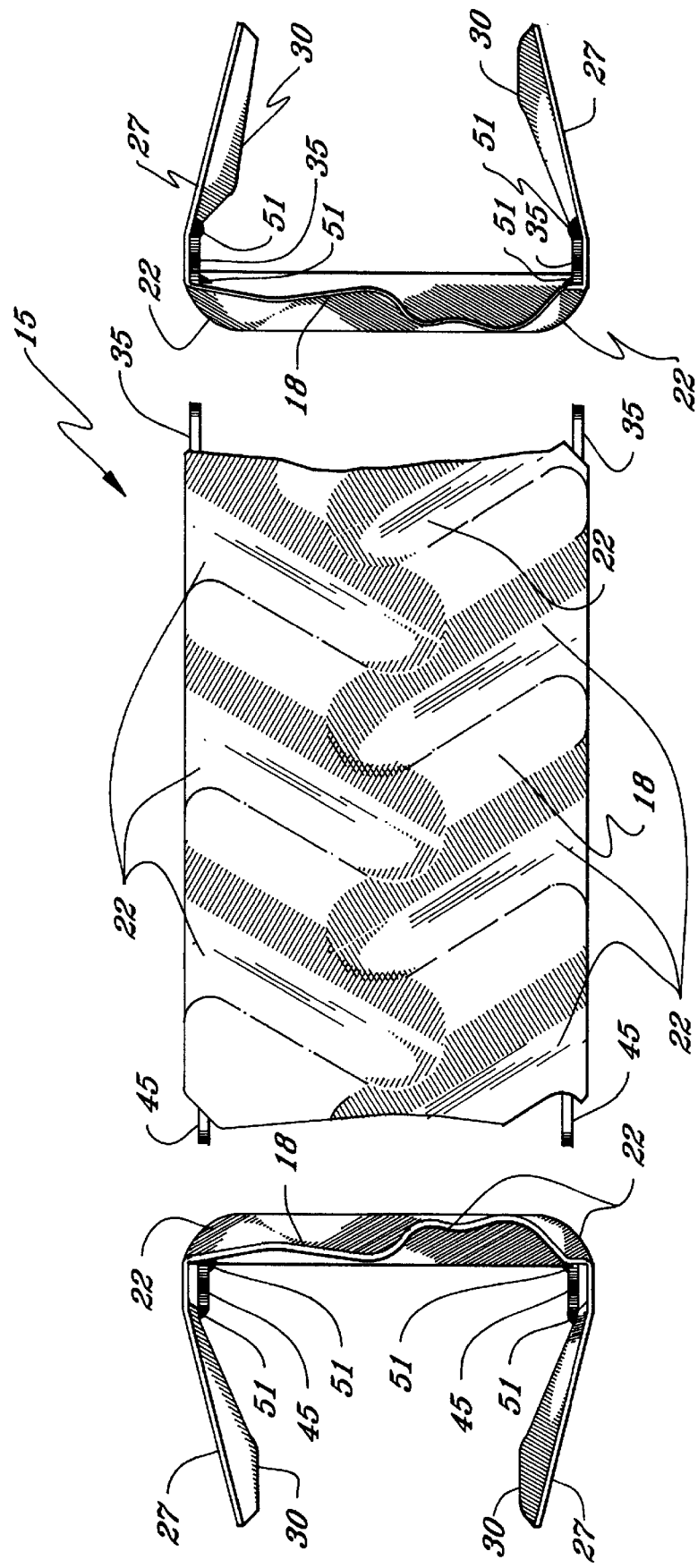

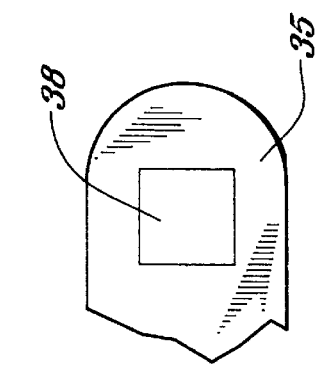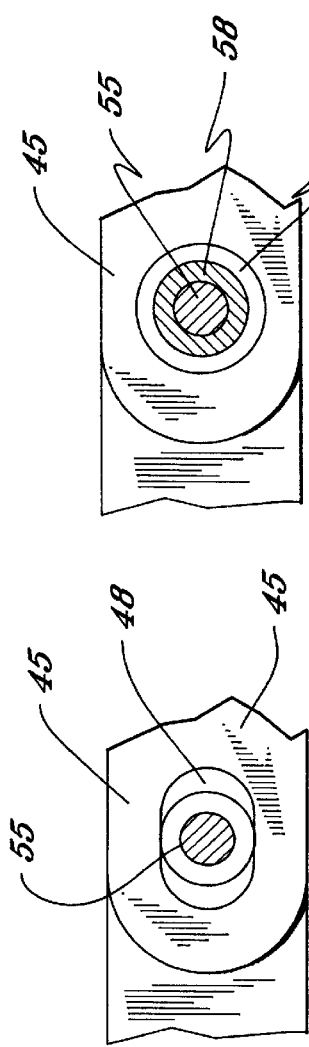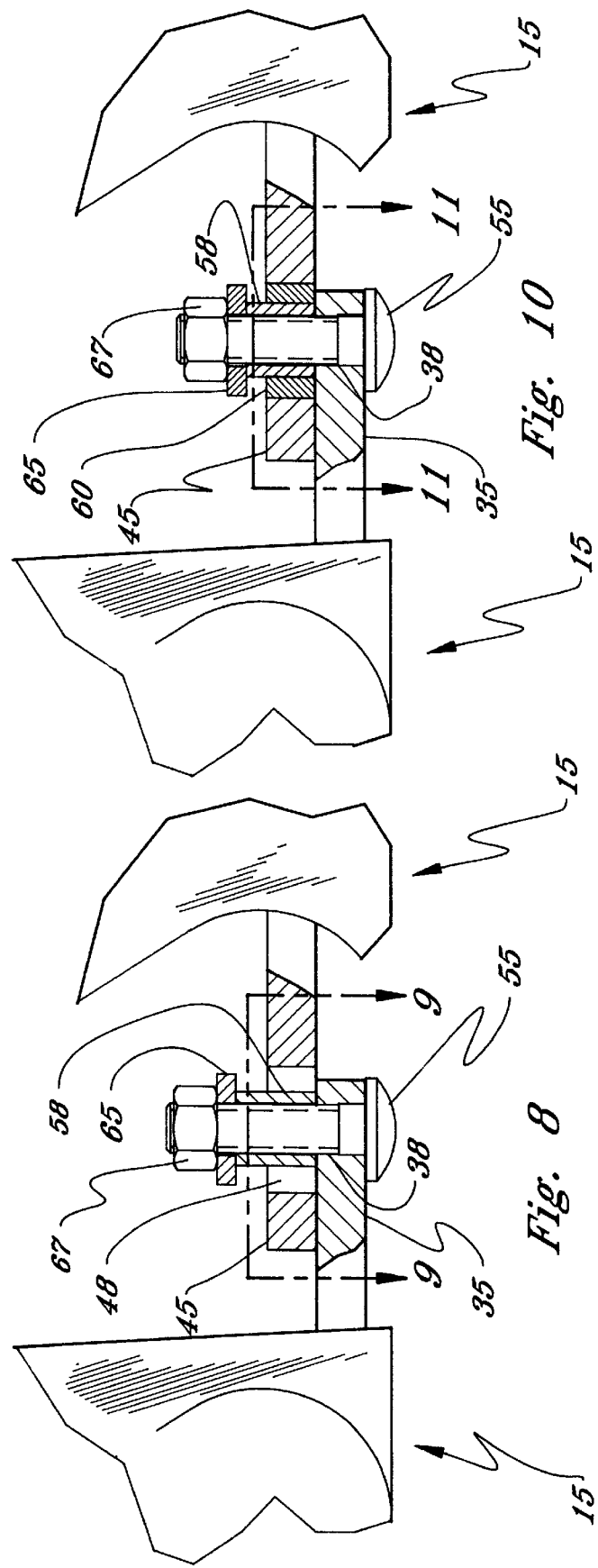

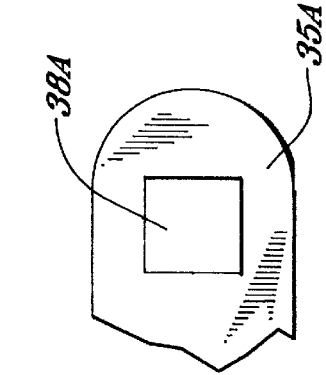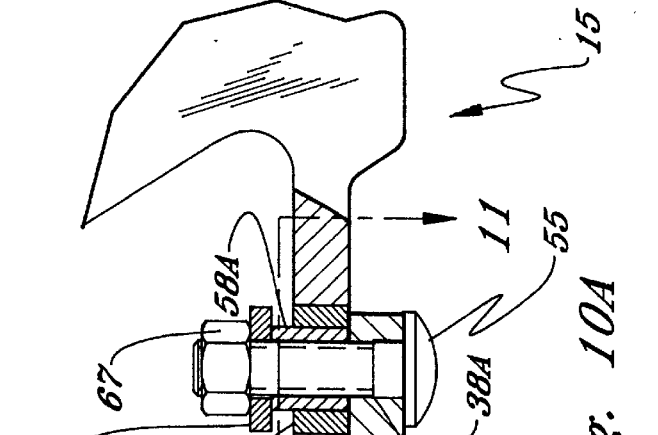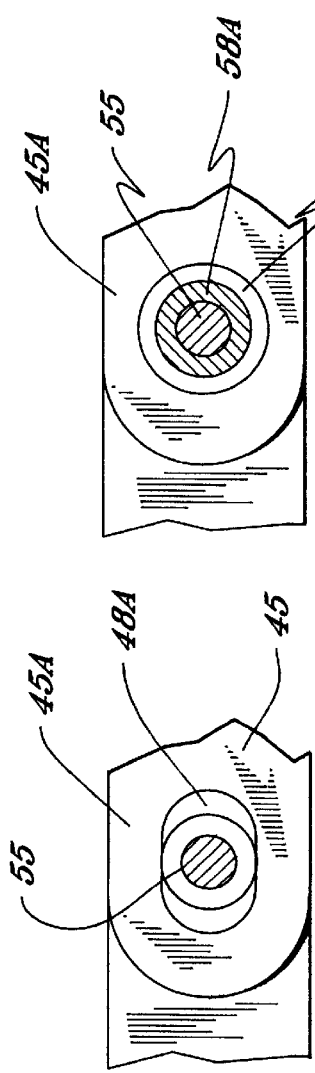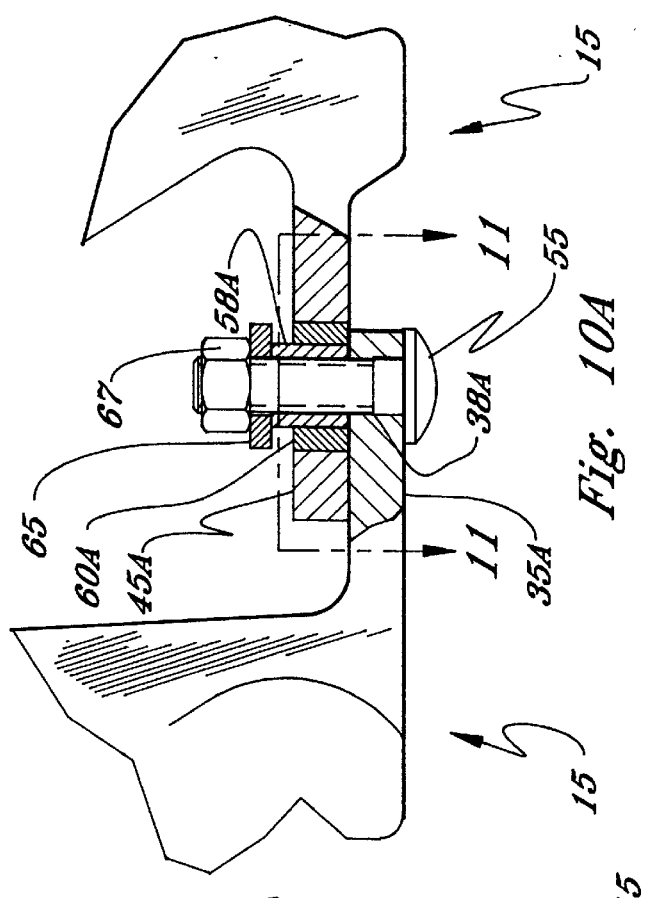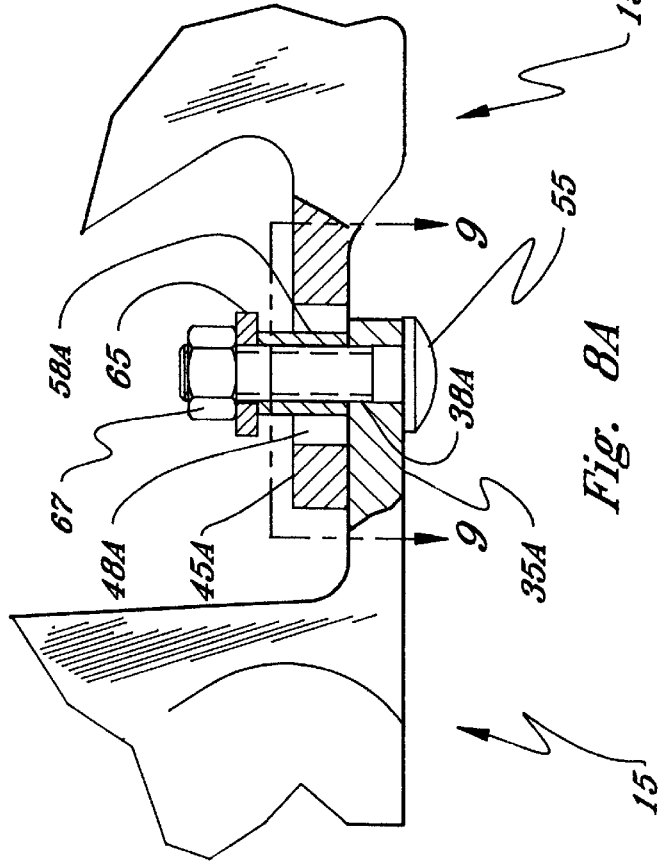

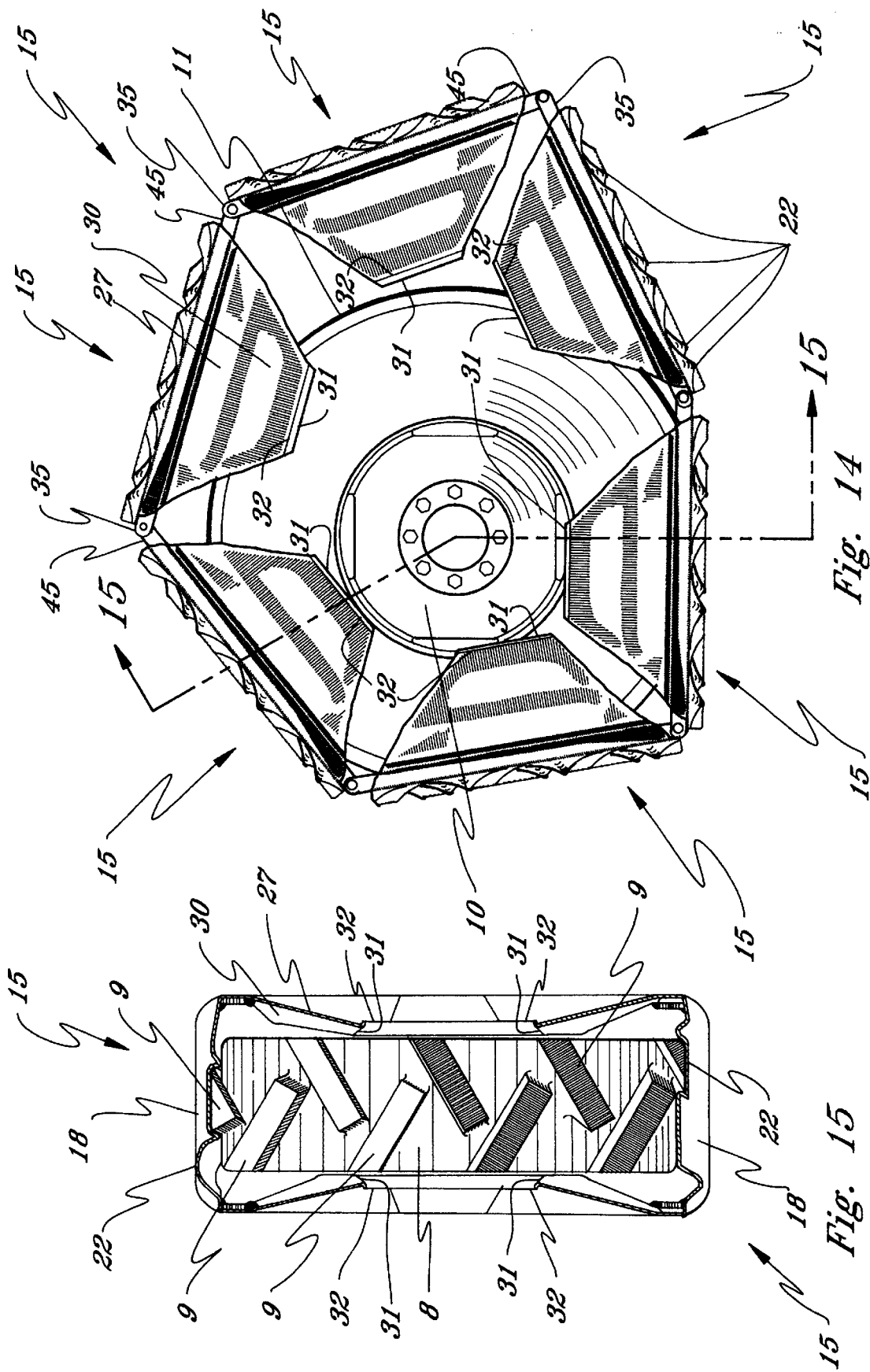

5,842,756

TRACTION DEVICE FOR WHEELS AND PROCESS FOR MAKING

FIELD OF THE INVENTION

The present invention relates generally to tires and/or wheels or tire/wheel units, to irrigation systems with interconnected pipe segments and to the vehicle tire/wheel drive systems which propel the interconnected sections of structure supported pipe sections of a irrigation system; in particular to the tire/wheel unit aspects of the drive system and more particularly to the contact of the tire surface to the earth. The irrigation system generally impacted by this invention is the center pivot irrigation system.

BACKGROUND OF THE INVENTION

Center pivot irrigation systems and other irrigation systems composed of interconnected structure supported pipe sections propelled by motor and gear assemblies are known with and shown as an example by U.S. Pat. No. 3,937,237 to Boone. Irrigation systems using a tire/wheel unit experience particular problems as irrigation occurs and the ground over which the tire/wheel unit traverses becomes wet and muddy. The tire/wheels frequently become stuck in the mud causing a disruption in the orderly movement of the irrigation pipe as required to irrigate the entire area under cultivation. The problem posed by such an impediment in the continued motion of a tire/wheel unit is one of the constant problems recognized in the operation of irrigation systems and one which required frequent management and repair. The disclosure of this invention is a device directed to overcoming this problem and the process of manufacturing the device. The referenced patent is provided herewith in an Information Disclosure Statement in accordance with 37 CFR 1.97.

SUMMARY OF THE INVENTION

The traction device for wheel and process for making disclosed herein is directed to tires/wheels generally and particularly to tire/wheel units of irrigation systems and to increasing the surface area contact between the tire/wheel unit circumference perimeter of an irrigation system vehicle propulsion system assembly and the muddy ground over which it must travel. The tire/wheel unit frequently, in the center pivot irrigation system, utilizes a standard 40" truck tire having a tread pattern consisting of 16 bars 8" apart. Approximately 60% of tires on such tire/wheel units have such a tractor tread pattern. The traction device is illustrated in FIGS. 1 through 15. The traction device for irrigation system tires/wheel unit is comprised of an interconnected series of traction device segments formed from material with sufficient material strength to withstand the stress caused principally with movement of the tire/wheel units. Sufficient traction device segments are interconnected to encompass tire/wheel at its circumferential perimeter. The traction device segments are interconnected by means including lugs and bolts, cables with retaining bracket means, and other devices which permit a hinge movement between adjoining traction device segments. Each traction device segment has a pad surface which comes in contact with the ground as the tire/wheel rotates. The pad is intermediate skirts which are generally orthogonal to the pad and which extend generally from the circumferential perimeter of the tire/wheel unit toward the hub of the tire/wheel unit. The skirts principally serve to retain the traction device for irrigation system wheels from disengaging from the tire/wheel unit during rotation.

When the tire/wheel unit rotates to a point between adjacent traction device segments two pads will be in contact with the ground. The pad surface is formed with a means to engage the surface of the tire/wheel unit at its circumferential perimeter with the means generally a structural feature of the traction device segment pad which engages a structural feature of the tire/wheel unit. Such feature could be a press formed generic tread pattern which engages some of the tread pattern of a tire/wheel unit. Alternatively, the feature may be a structural component welded or otherwise formed which comes into engagement with some structural feature of the tire/wheel causing rotation of the tread device segments as the tire/wheel unit rotates. For the preferred embodiment, the means is provided herein by press forming tread forms, into the pad, which match the tread pattern or surface pattern of the tire/wheel unit at its circumferential perimeter. The tread pattern at the tire/wheel circumferential perimeter fits into the tread forms and cause the traction device segment to rotate with the tire/wheel and tread as the tire/wheel rotates. The tread form pattern may be dissimilar between adjoining traction device segments in order to insure the ability of the tire/wheel tread pattern to be received into a tread form and thus enable advancement of the traction device. The preferred embodiment of the invention, in application in particular to the standard 40" tire, will complete a continuity of the tread pattern and tread forms within a set of three traction device segments. Two sets of three traction device segments, comprising six traction device segments, will be used in the preferred embodiment. One or more of the traction device segments will be in contact with the ground as the tire/wheel rotates thus increasing the surface area contact between the tire/wheel unit and the ground thereby decreasing the likelihood of the tire/wheel becoming mired and stuck in muddy earth.

The process of making the traction device, for the 40" tire, commences with a 30" square sheet metal blank. The size of blank will be changed if the invention is manufactured for tires of different sizes. The corners of the square, on one of the diagonals, are sheared. The shear is orthogonal to the diagonal. The shear edges form skirt edges of skirts proximal the skirt edges. A pad section of the traction device segment will be press formed, intermediate the two skirts, with a die having the shape of the tread pattern of the tire/wheel unit to create a tread form which protrudes generally away from the tire/wheel unit circumferential perimeter. The skirt is press formed with a die to form a skirt form protruding inwardly toward the tire/wheel. The skirt edge is rolled to form a skirt edge rolled away from the tire/wheel. Connection means between adjoining traction device segments are affixed by means to each traction device segment to enable the interconnection of adjoining traction device segments. Means of affixing the connection means to each traction device segment includes welding and the use of brackets, as shown in FIGS. 5 and 6 and FIGS. 12 and 13. Connection means will experience forces both in line with the direction of travel of the tire/wheel unit and orthogonal to the direction of travel. Connection means may be provided, for example as shown in FIGS. 4 to 11 and FIGS. 12 and 13 by lugs with bushings fixed together by bolts or cables with retaining bracket means. Other hinge devices may be used to interconnect the adjoining traction device segments.

BREIF DESCRIPTION OF THE DRAWINGS

The foregoing and other features and advantages of the present invention will become more readily appreciated as the same become better understood by reference to the following detailed description of the preferred embodiments of the invention when taken in conjunction with the accompanying drawings, wherein:

FIG. 4 is a top plan view of the traction device segment showing the pad with tread forms and connecting means in the form of lugs.

FIGS. 5 and 6 are end elevations of the traction device segment showing the pad with tread forms intermediate the skirts. The skirt form is depicted along with means for interconnecting the traction device segments in the form of lugs. The lugs are shown affixed to the traction device segment by welding.

Figure 7:
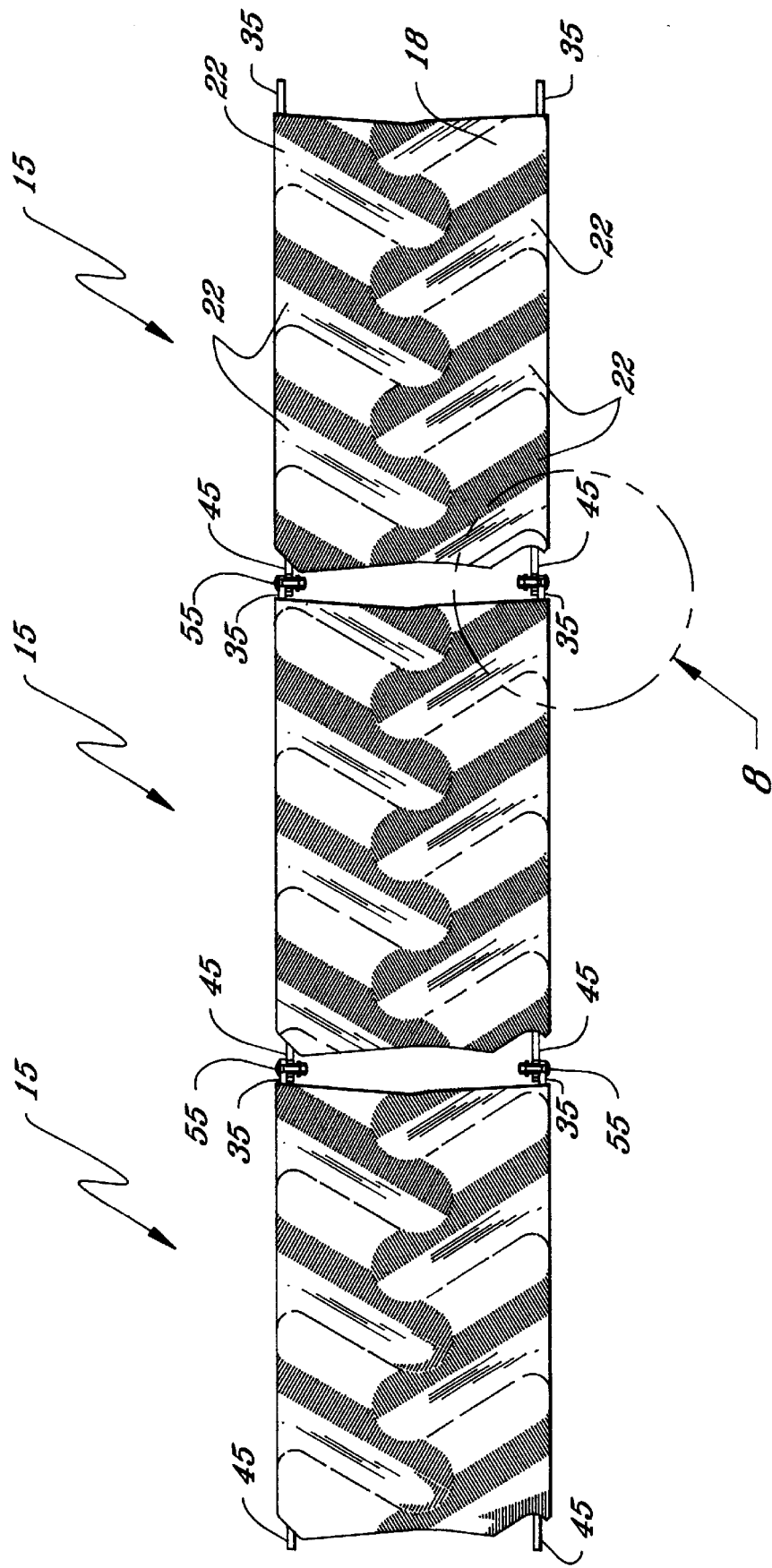

FIG. 7 is a top plan view of joined traction device segments interconnected with lugs. The illustration depicts the tread form showing the progression of the tread pattern among the interconnected traction device segments.

FIG. 8 is a detail from FIG. 7 showing a cross section of the structure of a lug connecting means depicting first lug and first lug aperture which receives a bolt, second lug and second lug aperture with a bearing surface and bushing. A washer and nut is depicted.

FIG. 8A depicts a lug connecting means where the lug is formed by press forming from the sheet metal stock used in the manufacturing of the traction device segment.

FIGS. 9, 10, 11 and 11B depicts sections or cross sections of a lug connecting means with bolt, bushings, washers and nuts.

FIGS. 9A, 10A, 11A, and 11C depicts lug connecting means formed by press forming from the sheet metal stock used in the manufacturing of the traction device segment.

Figure 12:
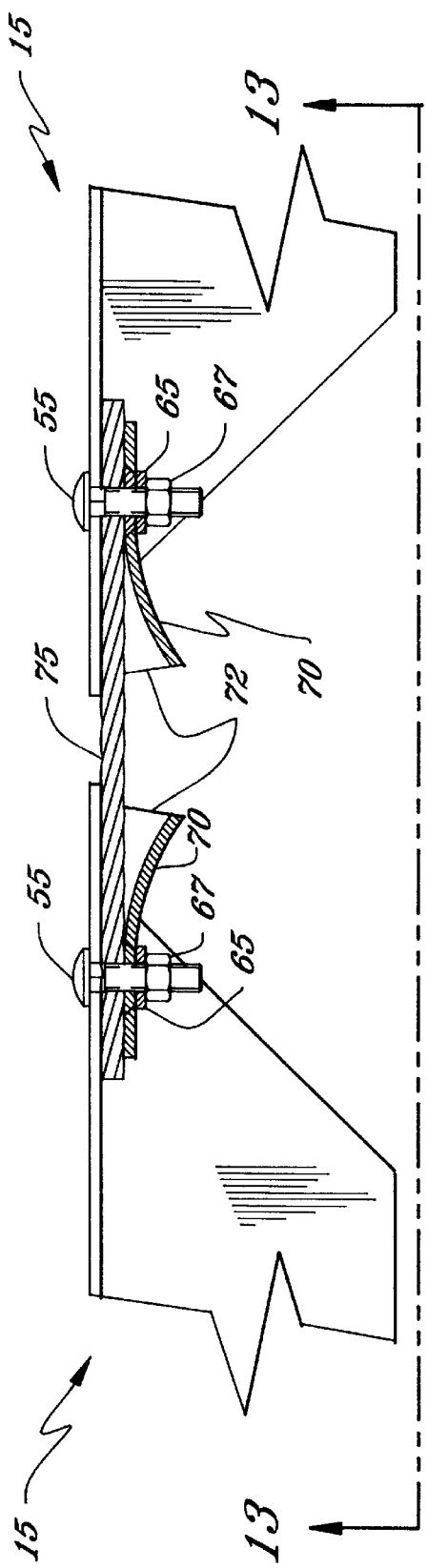
Figure 13:
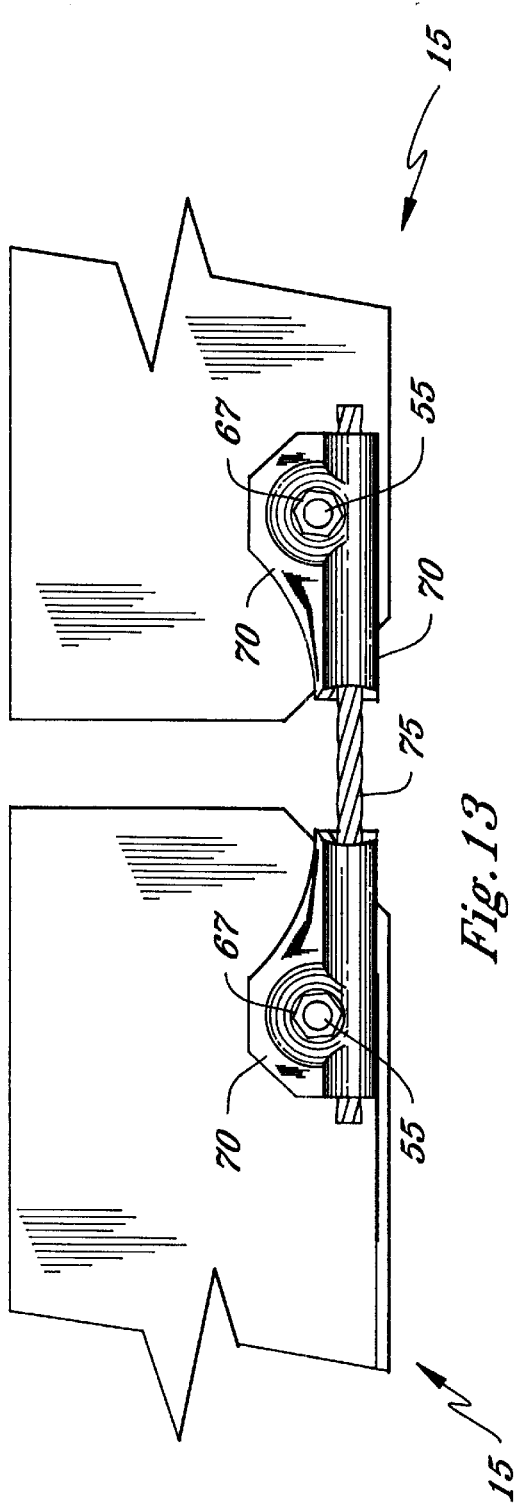

FIGS. 12 and 13 depicts an alternative connection means between traction device segments showing a bracket with a fluted throat. A cable is clamped between the bracket and the traction device segment by use, in this example, of a bolt and nut.

FIG. 14 illustrates a side elevation of a traction device composed of multiple traction device segments interconnected with lug means. The relationship of the pad and tread form is shown to the tire/wheel tread pattern at the circumferential perimeter of the tire/wheel unit. The relationship of the skirt is shown to the tire/wheel unit.

FIG. 15 is a section from FIG. 14 showing the tread interlocking with the tread form of the traction device segment. The skirt is depicted in relationship to the tire/wheel unit.

DETAILED DESCRIPTION

The preferred embodiment of traction device for wheels and process for making illustrated in FIGS. 1 through 11 and FIGS. 14 and 15 wherein an irrigation system 5 is composed of interrelated irrigation pipe segments with supporting structures and tire/wheel drive systems having tire/wheel units. The traction device for wheel 1 is comprised of an interconnected series or sequence of traction device segments 15 with the first traction device segment 15 of the series or sequence interconnected with the last traction device segment 15 of the series or sequence to form a continuous interconnected chain of traction device segments 15. The traction device segments 15 formed from material with sufficient material strength to withstand the stress caused principally with movement of the tire/wheel units. The traction device segments 15 are formed from $\frac{3}{16}$" galvanized mild steel in the preferred embodiment and will generally be formed from plate steel or sheet metal. Sufficient traction device segments 15 are interconnected to encompass the tire/wheel of a tire/wheel unit 8 at its circumferential perimeter 11.

The traction device segments 15 are interconnected by hinge means including lug means and bolts, cables with retaining brackets and other devices which permit a hinge movement between hinge means interconnected adjoining traction device segments 15 shown in FIGS. 8, 9, 10 and 11 and FIGS. 12 and 13. FIGS. 8A, 9A, 10A and 11A show alternative form of a lug connection wherein the lug is formed integral with the traction device segment during the pressing process from the sheet metal stock from which the traction device segment is manufactured. The interconnection means of the preferred embodiment is by lugs formed from $\frac{3}{16}$" plate steel, shown in FIGS. 3 through 11 and 14 and 15, fixed together with a $\frac{1}{2}$" carriage bolt. First and second lugs 35, 45 are affixed, by welds 51 in the preferred embodiment, to each traction device segment 15 such that alignment will occur between first lugs 35 of one traction device segment with second lugs 45 affixed, by welds 51 in the preferred embodiment, to an adjoining traction device segment 15. The first and second lugs 35, 45 will have aperture means to receive joining means and bearing means to effect a hinge connection between the first and second lugs. In the preferred embodiment a first lug aperture 38 and a second lug aperture 48 which will align so that a $\frac{1}{2}$" steel carriage bolt with thread means is received into the first lug aperture 38 into a first bushing 58, providing a bearing surface, with the first bushing 58 received into and through the second lug aperture 48 with the bolt secured by a washer 65 and nut 67 at the thread means. The first lug aperture 38, in the preferred embodiment, is square in shape to receive the square in cross section shoulder of a carriage bolt to enable the bolt 55 to remain stationary when the nut 67 is tightened. The second lug aperture 48 may be circular or oval in shape or formed as a slot in the preferred embodiment and a second bushing 60, providing a bearing surface, may be received into the second lug aperture 48 into which is received the first bushing 58 to provide an alternative bearing means.

An alternative embodiment of the lug connection is addressed by the formation of alternative first and second lugs 35A, 45A as a part of the press form process of manufacturing the traction device segments. The interconnection means of the alternative embodiment is by alternative lugs, shown in FIGS. 8A through 11A, fixed together with a $\frac{1}{2}$" carriage bolt. Alternative first lugs 35A are press formed in the traction device segment 15 such that alignment will occur with alternative second lugs 45A, similarly formed, on an adjoining traction device segment 15. The alternative first and second lugs 35A, 45A will have aperture means to receive fixing means and bearing means provided, in the preferred embodiment by an alternative first lug aperture 38A and an alternative second lug aperture 48A which will align so that, in the preferred embodiment, a $\frac{1}{2}$" steel carriage bolt with thread means is received into the alternative first lug aperture 38A into an alternative first bushing 58A with the alternative first bushing 58A received into and through the alternative second lug aperture 48A with the bolt secured by a washer 65 and nut 67 at the thread means. The alternative first lug aperture 38A, in the alternative embodiment, is square in shape to receive the square in cross section shoulder of a carriage bolt to enable the bolt 55 to remain stationary when the nut 67 is tightened. The alternative second lug aperture 48A may be circular or oval in shape or formed as a slot in the alternative embodiment and an alternative second bushing 60A may be received into the alternative second lug aperture 48A into which is received the alternative first bushing 58A to provide an alternative bearing means.

An alternative means of connection of traction device segments is by steel cable fastened to each traction device segment by bracket means. The bracket may be clamped with a bolt and washer/nut means to secure the cable between a portion of a traction device segment and the bracket.

Figure 1:
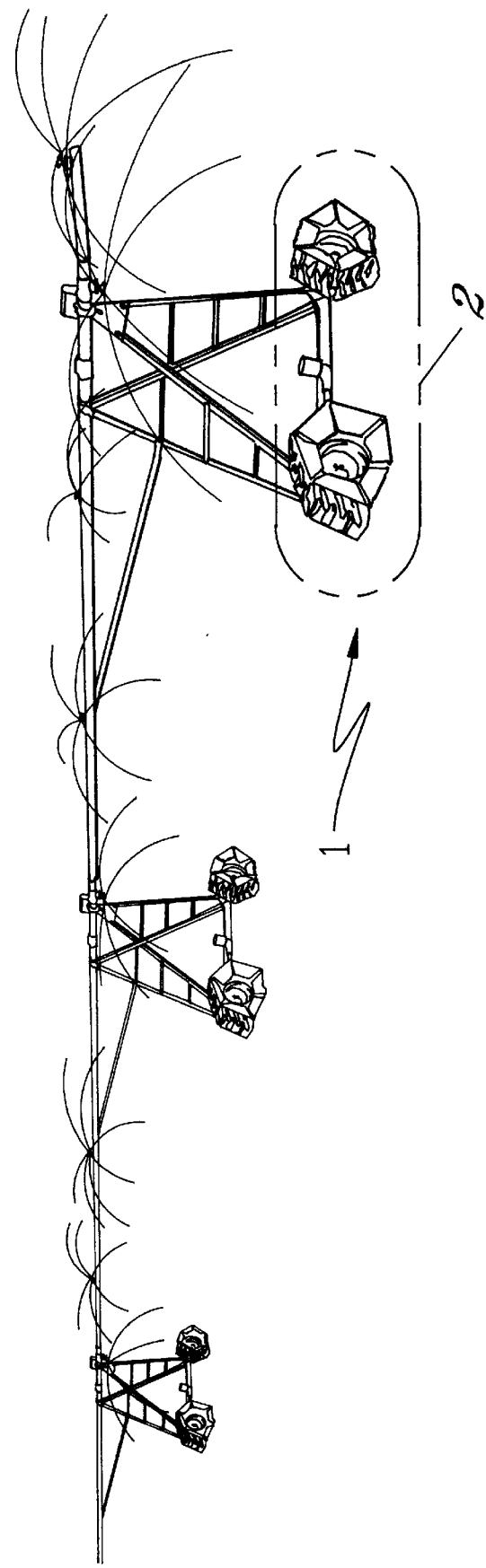
FIG. 1 depicts an irrigation system in the form commonly seen in a center pivot irrigation system.
Figure 2:
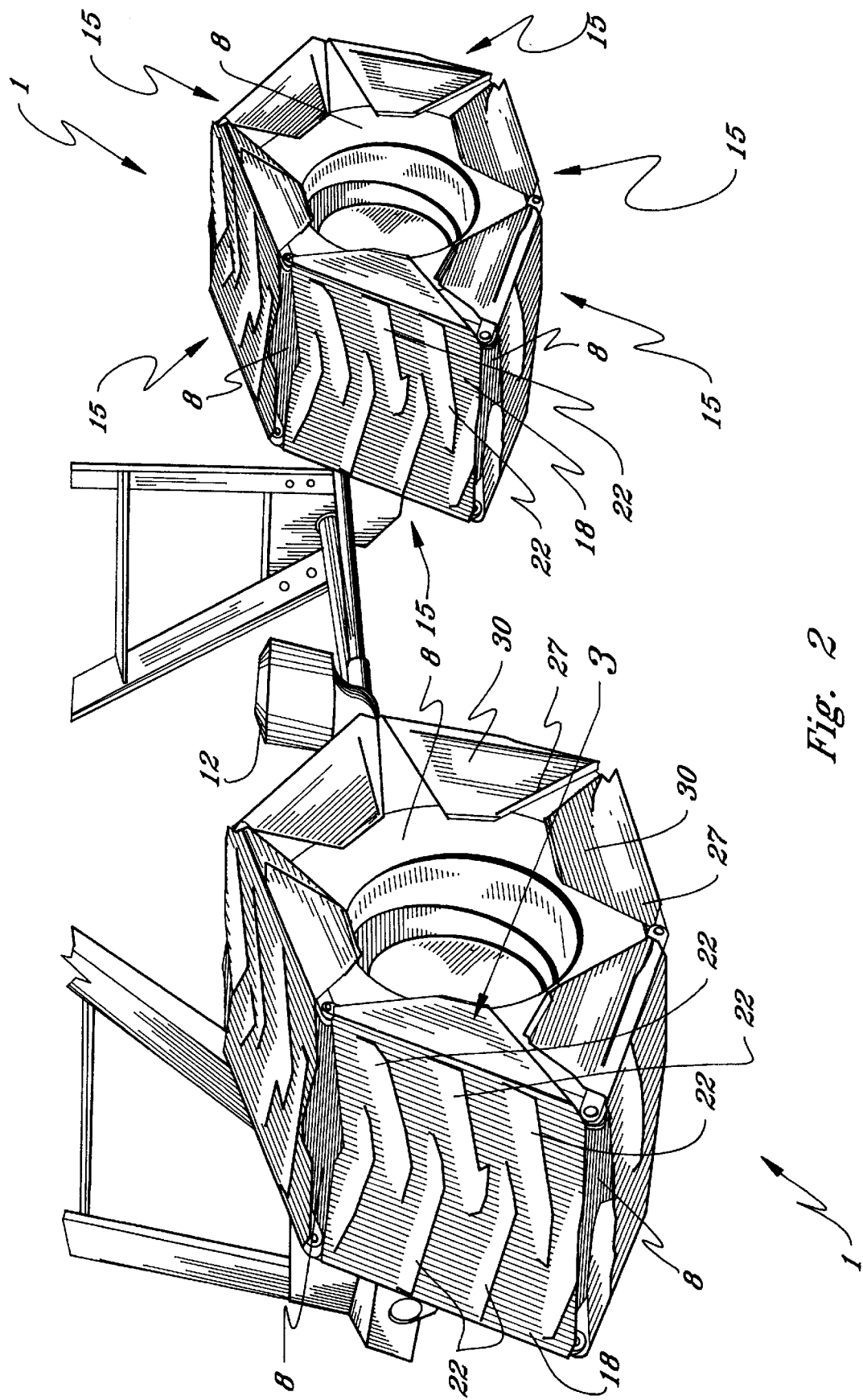
FIG. 2 is a detail, from FIG. 1, showing the traction device disclosed herein.
Figures 3, 3A:
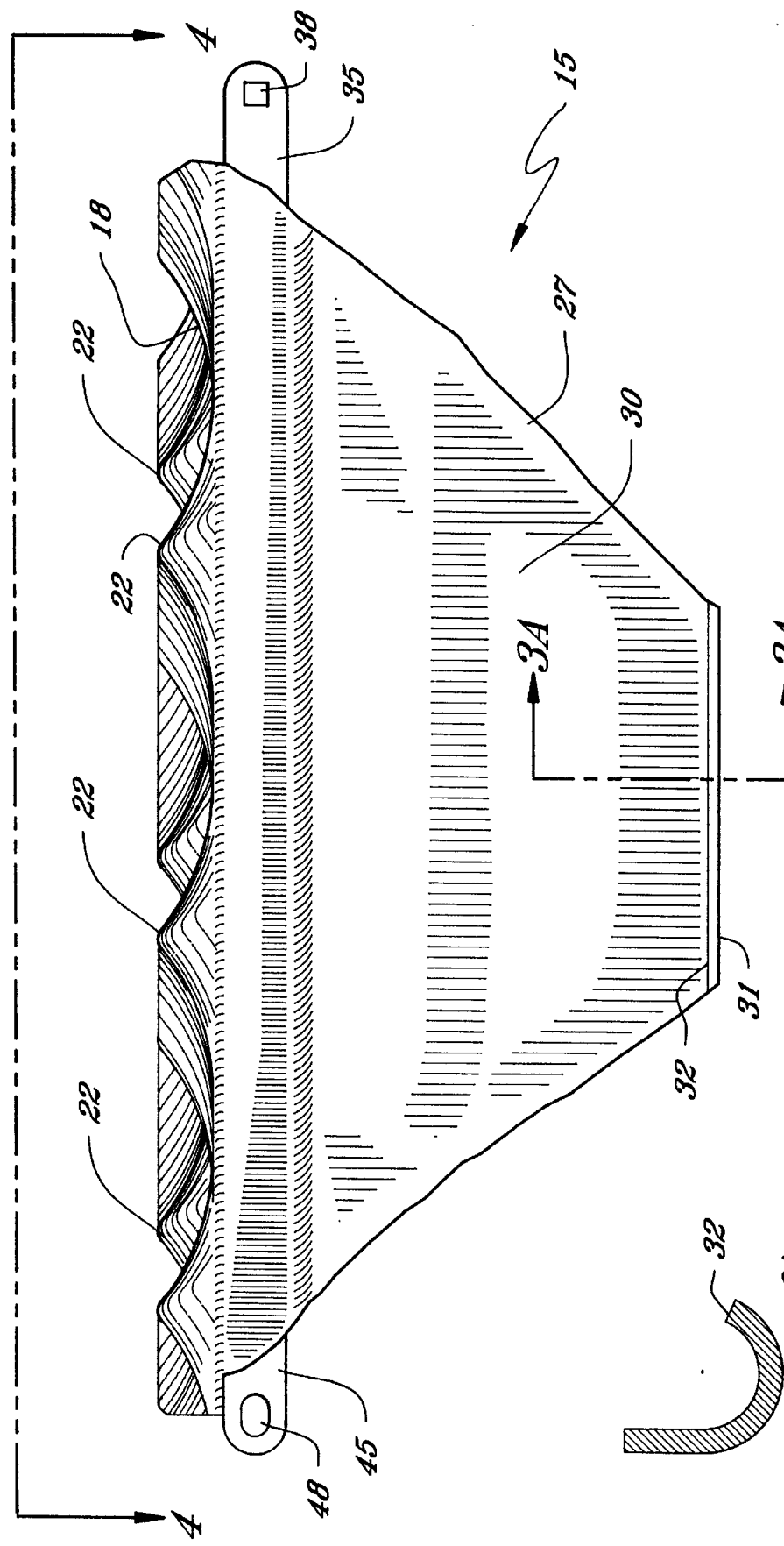
FIG. 3 is side elevation of the traction device segment showing the skirt, the skirt edge and skirt radius, the skirt form, the pad and tread forms. Interconnecting means in the form of lugs are shown.
FIG. 3A is a detail showing the skirt edge and skirt radius.

Each traction device segment has a pad 18 which comes in contact with the ground as the tire/wheel unit 8 rotates. The pad 18 is press formed with tread forms 22 which match the tread pattern 9 or surface pattern of the tire/wheel unit 8 at its circumferential perimeter 11. The tread pattern 9 at the tire/wheel unit 8 circumferential perimeter 11 fits into the tread forms 22 and cause the traction device segment 15 to rotate with the tire/wheel unit 8 and tread pattern 9 as the tire/wheel unit 8 is caused to rotate generally by a motor/gear assembly 12 as shown in FIG. 2. The tread form 22 pattern may be dissimilar between adjoining traction device segments 15 in order to insure the ability of the tire/wheel tread pattern 9 to be received into a tread form 22 and thus enable advancement of the traction device. Two sets of three traction device segments 15, comprising six traction device segments 15, will be joined in the preferred embodiment. One or more of the traction device segments 15 will be in contact with the ground as the tire/wheel unit 8 rotates thus increasing the surface area contact between the tire/wheel unit 15 and the ground thereby decreasing the likelihood of the tire/wheel unit 15 becoming mired and stuck in muddy earth. The pad 18 is intermediate skirts 27 which function to retain the traction device for wheels and process form making 1 on the tire/wheel unit 8 while the tire/wheel unit 8 and traction device 1 rotates. Each skirt 27 has a press formed skirt form 30 protruding inward toward the tire/wheel unit 8 for the purpose of lessening the amount of contact between the skirts 27 with the tire/wheel unit 8. When installed on a tire/wheel unit 8 the traction device segment 15 skirt 27 terminates in a skirt edge 31 generally proximal to a tire/wheel unit hub 10. The skirt edge 31 is rolled with a skirt edge radius 32 such that the rolled skirt edge 31 is rolled away from the tire/wheel unit hub 10 and thereby lessen the likelihood of contact between the tire/wheel unit 8 and a sharp or cutting surface from the traction device segment 15 skirt 27. The pad 18 may alternatively be formed with a means to engage the surface of the tire/wheel unit 8 at its circumferential perimeter 11 with the means generally a structural feature of the traction device segment pad 18 which engages a structural feature of the tire/wheel unit 8. Such feature could be a press formed generic tread pattern which engages some of the tread pattern 9 of a tire/wheel unit 8. Alternatively, the feature may be a structural component welded or otherwise formed which comes into engagement with some structural feature of the tire/wheel unit 8 causing rotation of the tread device segments 15 as the tire/wheel unit 8 rotates. The rotation of the tread device for wheels 1 may alternatively be caused by the friction and pinching effect of the tread device segments 15 against the circumferential perimeter 11 as the tire/wheel unit 8 rotates.

The pad 18 is intermediate skirts 27 which are generally orthogonal to the pad 18 and which extend generally from the circumferential perimeter 11 of the tire/wheel unit 8 toward the hub 10 of the tire/wheel unit 8. The skirts 27 principally serve to retain the traction device for wheels 1 from disengaging from the tire/wheel unit 8 during rotation.

The process of making the traction device commences with a square sheet metal blank. The corners of the square, on one of the diagonals, are sheared forming the skirt edge. The shear, and thus skirt edge 31, is orthogonal to the diagonal. A skirt 27 is formed proximal each skirt edge 31. A pad 18 section of the traction device segment 15 will be press formed intermediate the two skirts 27. The pad 18 section of the remaining blank is press formed with a die having the shape of the tread pattern 9 of the tire/wheel unit 8 such that the pad 18 portion of the remaining blank forms a traction device pad 18 having a tread form 22 intermediate the two skirt edges 31. Each skirt 27, intermediate the pad 18 and skirt edge 31, are press formed with a die to form a skirt form 30 protruding inwardly toward the tire/wheel unit 8. The skirt edge 31 is rolled to form a skirt edge radius 32 which is rolled away from the tire/wheel unit 8. Connection means between adjoining traction device segments 15 are affixed by means to each traction device segment 15 intermediate the skirt 27 and pad 18 such as to be aligned with and connected to connection means affixed by means to adjoining traction device segments 15. Connection means for the preferred embodiment is by first and second lugs 35, 45. Means of affixing the connection means to each traction device segment includes welding and the use of brackets, as shown in FIGS. 5 and 6 and FIGS. 12 and 13. Connection means will experience forces both in line with the direction of travel of the tire/wheel unit and orthogonal to the direction of travel. Connection means may be provided, for example as shown in FIGS. 4 to 11 and FIGS. 12 and 13 by lugs with bushings fixed together by bolts or cables with retaining bracket means. Other hinge devices may be used to Interconnect the adjoining traction device segments.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A traction device for wheels comprising:

a plurality of traction device segments;

the traction device segments being arranged sequentially; adjoining traction device segments being interconnected by hinge means; a first traction device segment of the sequence being interconnected by hinge means to a last traction device segment of the sequence to form a continuous chain of interconnected traction device segments:

the interconnected traction device segments encompassing a tire/wheel unit, having a circumferential perimeter and a hub the tire of the tire/wheel unit having a patterned tread; the tire/wheel unit engaging, by means, one or a plurality of adjoining traction device segments causing the interconnected traction device segments to rotate with the tire/wheel unit, when the tire/wheel unit is caused to rotate:

each traction device segment having a pad which comes in contact with the ground as the tire/wheel unit and traction device rotate; the pad being intermediate skirts which retain the traction device on the tire/wheel unit while the tire/wheel unit and traction device rotate; the skirts being oriented generally orthogonal to the pad and extending generally from the pad at the circumferential perimeter of the tire/wheel unit toward the hub of the tire/wheel unit;

the hinge means interconnecting adjoining traction devices being lug means connected by bolt and nut means, the lug means comprising first and second lugs extending from each traction device segment such that alignment will occur between first lugs of one traction device segment and the second lugs of an adjoining traction device segment, the first and second lugs each having aperture means to receive joining means and bearing means the joining means between first and second lugs to effect a hinge connection between adjoining traction device segments being provided by a bolt with thread means received into the first lug aperture and further into a first bushing with the first bushing received into and through the second lug aperture, the bolt being secured by a washer and nut at the thread means.

2. The invention according to claim 1 wherein: a second bushing is received into the second lug aperture, first bushing being received into the second bushing to provide bearing surfaces.

3. The invention according to claim 1 wherein:

the first and second lugs are formed integral with each traction device segment.

4. The invention according to claim 1 wherein:

the pad is press formed with tread forms, the tread of the tire of the tire/wheel unit being partially or wholly received into the tread forms on the adjoining pads when the traction device is mounted on the tire/wheel unit, thereby providing a means by which the pad engages the tire of the tire/wheel unit.

5. The invention according to claim 4 wherein: the press formed tread forms match the tread pattern of the tire of the tire/wheel unit.

6. The invention according to claim 1 wherein:

each skirt has a press formed skirt form protruding toward the tire/wheel unit to lessen the contact between the skirt and the tire/wheel unit, each skirt terminates in a skirt edge generally proximal to a tire/wheel unit hub.

7. The invention according to claim 6 wherein:

A. the skirt edge is rolled with a skirt edge radius such that the rolled skirt edge is rolled away from the tire/wheel unit hub.

8. A method of making the device of claim 1 comprising the steps of:

selecting a sheet metal blank having the shape of square;

shearing the corners at the ends of one of the diagonals of the square, forming skirt edges; the shear being generally orthogonal to the diagonal, forming a skirt proximal to each skirt edge;

press forming a pad intermediate the two skirts; the pad being press formed with a die having the shape of a generic tread pattern, thereby producing a traction device segment.

9. The invention of claim 1, wherein the means interconnecting the traction device segments is a length of cable interconnecting each pair of adjoining segments, the cable being fastened to each segment by bracket means, the bracket being clamped by a bolt and nut to secure the cable between a portion of a segment and the bracket.

10. A traction device for wheels comprising;

a plurality of traction device segments:

the traction device segments being arranged sequentially: adjoining traction device segments being interconnected by hinge means; a first traction device segment of the sequence being interconnected by hinge means to a last traction device segment of the sequence to form a continuous chain of interconnected traction device segments:

the interconnected traction device segments encompassing a tire wheel unit, the tire/wheel unit having circumferential perimeter and a hub; the tire of the tire/wheel unit having a patterned tread;

each traction device segment having a pad which comes in contact with the ground as the tire/wheel unit and traction device rotate; the pad being intermediate skirts which retain the traction device on the tire/wheel unit while the tire/wheel unit and traction device rotate; the skirts being oriented generally orthogonal to the pad and extending generally from the pad at the circumferential perimeter of the tire/wheel unit toward the hub of the tire/wheel unit;

the pad of each traction device segment being press formed with tread forms the press formed tread forms substantially matching the tread pattern of the tire of the tire/wheel unit the tread form being dissimilar between adjoining traction device segments such that the tread of the tire of the tire/wheel unit may be continuously received into the press formed tread forms across adjoining pads when the tire/wheel unit rotates, thereby providing a means by which the tire of the tire/wheel unit continuously engages the pads when the tire/wheel unit rotates.

* * * * *